United States Patent
Calderone et al.

(10) Patent No.: US 10,005,069 B2
(45) Date of Patent: Jun. 26, 2018

(54) CORE-SHELL PARTICLES WITH CATALYTIC ACTIVITY

(71) Applicant: Total Raffinage Chimie, Courbevoie (FR)

(72) Inventors: Vincenzo Roberto Calderone, Delft (NL); Nirappurackal Raveendran Shiju, Amsterdam (NL); Gad Rothenberg, Oegstgeest (NL); Daniel Curulla-Ferre, Courbevoie (FR)

(73) Assignee: Total Raffinage Marketing, Puteaux (FR)

( * ) Notice: Subject to any disclaimer, the term of this patent is extended or adjusted under 35 U.S.C. 154(b) by 0 days. days.

(21) Appl. No.: 15/188,517

(22) Filed: Jun. 21, 2016

(65) Prior Publication Data

US 2016/0296914 A1 Oct. 13, 2016

Related U.S. Application Data

(63) Continuation of application No. 14/649,849, filed as application No. PCT/EP2013/075452 on Dec. 4, 2013, now Pat. No. 9,468,910.

(30) Foreign Application Priority Data

Dec. 4, 2012 (EP) .................................... 12306513

(51) Int. Cl.

| | | |
|---|---|---|
| *B01J 23/00* | (2006.01) | |
| *B01J 23/75* | (2006.01) | |
| *B01J 37/03* | (2006.01) | |
| *B01J 37/18* | (2006.01) | |
| *B01J 35/00* | (2006.01) | |
| *B01J 35/02* | (2006.01) | |
| *B01J 35/08* | (2006.01) | |
| *C10G 2/00* | (2006.01) | |
| *B01J 21/04* | (2006.01) | |

(52) U.S. Cl.

CPC .............. *B01J 23/75* (2013.01); *B01J 21/04* (2013.01); *B01J 35/0006* (2013.01); *B01J 35/006* (2013.01); *B01J 35/008* (2013.01); *B01J 35/0013* (2013.01); *B01J 35/023* (2013.01); *B01J 35/08* (2013.01); *B01J 37/035* (2013.01); *B01J 37/18* (2013.01); *C10G 2/332* (2013.01)

(58) Field of Classification Search

CPC ........ B01J 23/75; B01J 35/0006; B01J 21/04; B01J 35/0013; B01J 35/006; B01J 37/18; B01J 35/023; B01J 35/08; B01J 37/035; B01J 35/008; C10G 2/332

USPC ......................................................... 502/325

See application file for complete search history.

(56) References Cited

U.S. PATENT DOCUMENTS

| | | |
|---|---|---|
| 6,235,677 B1 | 5/2001 | Manzer et al. |
| 7,361,626 B2 | 4/2008 | Baijense et al. |
| 7,851,404 B2 | 12/2010 | Lok |
| 2004/0127587 A1 | 7/2004 | Espinoza et al. |
| 2005/0075240 A1 | 4/2005 | Yamamoto |
| 2007/0270514 A1 | 11/2007 | Lok et al. |
| 2010/0189615 A1* | 7/2010 | Gramiccioni ........ B01D 53/945 423/213.2 |
| 2014/0087936 A1 | 3/2014 | Calderone et al. |

FOREIGN PATENT DOCUMENTS

CN 101954256 A 1/2011

OTHER PUBLICATIONS

PCT Notification of Transmittal of the International Preliminary Report on Patentability for PCT/EP2013/075452, dated Mar. 23, 2015, 11 pgs.
PCT International Search Report for PCT/EP2013/075452, dated Mar. 20, 2014, 4 pgs.
Martinez et al., "Nanofibrous $\gamma$-$Al_2O_3$ as support for Co-based Fischer-Tropsch catalysts: Pondering the relevance of diffusions and dispersion effects on catalytic performance" *Journal of Catalysis*, 2653 (2009) 292-305, 14 pgs.
Horiba Scientific, "A Guidebook to Particle Size Analysis," © 2012, 32 pgs.
Evonik Industries AG®, "New Temperature Stable Fumed Alumina for Catalyst Applications," *Catalyst Carrier Newsletter*, Issue Jul. 2013, 3 pgs.
Sinkler, W., et al., "3D-TEM Study of Gamma Alumina Catalyst Supports," *Microscopy and Microanalysis*, vol. 12, No. S02, Jul. 31, 2006 (Jul. 31, 2006), (pp. 52-53), XP055104436, ISSN: 1431-9276, DOI: 10.1017/S1431927606067869 the whole document.
Subramanian et al., "A Drifts study of CO adsorption and hydrogenation on Cu-based core-shell nanoparticles," *Catalysis Science & Technology*, 2012, 2, 621-631, 12 pgs.

* cited by examiner

*Primary Examiner* — Haytham Soliman
(74) *Attorney, Agent, or Firm* — Patterson Thuente Pedersen, P.A.

(57) ABSTRACT

The present invention pertains to novel core-shell particles comprising a core of alumina and a shell of cobalt oxide, characterized in that they are spherical with a number average diameter, as measured by TEM, of between 10 and 30 nm. This invention also pertains to the method for preparing these core-shell particles and to their uses in the manufacture of a catalyst.

7 Claims, No Drawings

US 10,005,069 B2

CORE-SHELL PARTICLES WITH CATALYTIC ACTIVITY

RELATED APPLICATIONS

This application is a continuation of application Ser. No. 14/649,849 filed Jun. 4, 2015, which is a National Phase entry of PCT Application No. PCT/EP2013/075452, filed Dec. 4, 2013, which claims priority from EP Patent Application No. 12306513.8, filed Dec. 4, 2012, said applications being hereby incorporated by reference herein in their entirety.

FIELD OF THE INVENTION

The present invention pertains to novel core-shell particles comprising a core of alumina and a shell of cobalt oxide, characterized in that these particles are spherical with a number average diameter, as measured by TEM, of between 10 and 30 nm. This invention also pertains to the method for preparing these core-shell particles and to their uses in the manufacture of a catalyst.

BACKGROUND OF THE INVENTION

The Fischer-Tropsch process generally comprises a first step which consists in reacting a source of carbon (such as coal, natural gas or biomass) with a source of oxygen (such as steam, air or oxygen) to form a mixture of carbon monoxide and hydrogen, usually referred to as syngas. A second step is then carried out, which involves contacting the syngas with a Fischer-Tropsch catalyst, which leads to hydrocarbons and water. The main products of the Fischer-Tropsch reaction are linear olefins and paraffins and water. It is well known that the nature of the hydrocarbons produced, and their chain length, may vary depending on the process conditions and the catalyst used. The third step involves isomerisation of the hydrocarbons formed in the second step to produce more valuable products. For instance, the longer chains in the product may be cracked to form products in the diesel or gasoline range, and linear paraffins may be isomerised to improve diesel product properties such as cloud point and pour point. Generally, adapted hydrotreating catalysts are used for this third step.

Typical catalysts used in the second step of the above process are made by kneading or impregnation of carriers made of micrometric particles of alumina, silica, titania, silicon carbide, carbon or mixtures thereof, with a metal such as cobalt having a particle size comprised between 10 and 20 nm.

They suffer from the drawback that most of the catalytic metal, which is inside of the catalyst particles, does not participate in the catalytic process. There is thus a waste of the catalytic metal which is economically disadvantageous, especially in the case of cobalt, which is a rather expensive catalytic metal. In order to overcome this drawback, the present inventors have contemplated using core-shell particles, which comprise a core in a cheaper material than cobalt and a shell of cobalt. These particles comprise a much lower amount of cobalt than known catalysts, while approaching the same catalytic activity.

A cobalt-based catalyst, comprising particles having a core-shell structure and which is said to be selective towards the Fischer-Tropsch reaction, has been disclosed in U.S. Pat. No. 7,361,626. This catalyst may be prepared according to the following process. A zinc oxide layer is first applied on the surface of an oxidic core material, typically, alumina, by means of a so called "layer-by-layer" (or "LBL") method, so as to obtain a core-shell support. A catalytically active material, such as cobalt, is then added to this core-shell support either by impregnation or deposition-precipitation. Thereafter, the resulting particles are calcined and hydrogenated to produce a metal-based catalyst. This process involves several steps and the use of a surfactant to anchor the zinc oxide layer to the chemically inert aluminium core, which increases its cost. Moreover, the core-shell particles thus obtained can be described as having a core-shell support coated with large crystallites of cobalt. Consequently, they do not allow reducing the cobalt content of the catalyst particles, which is not the purpose for which these attrition-resistant particles have been designed. Moreover, the size of these particles may be detrimental to the activity and selectivity of the catalyst made therefrom.

Therefore, there remains the need to provide a simple and cost-effective method for preparing core-shell particles which dimensions may be easily controlled and which may be used to manufacture a catalyst having good selectivity towards the Fischer-Tropsch reaction and good productivity.

This need has been satisfied by a novel method which involves homogeneous deposition-precipitation of cobalt carbonate onto nanoparticles of alumina. This method leads to specific nanoparticles having a core consisting of nanoparticles of alumina and a shell comprising cobalt. To the inventors' knowledge, these particles have never been described before. The precipitation-deposition method has already been applied in U.S. Pat. No. 7,851,404 and US 2007/270514 to the manufacture of cobalt-based catalysts. In these documents, a cobalt compound, obtained by decomposition of a cobalt amine complex under basic conditions, is deposited onto particles of a carrier material in the form of a powder or of a shaped granular material, or onto a titania-coated alumina. The carrier core has a mean diameter of several microns and no information is given about cobalt crystallite size. The thickness of the cobalt layer in US 2007/270514 ranges from 5 to 250 μm. It has been shown in the Examples below that the productivity, on cobalt mass basis, of these catalysts could still be improved.

Other core-shell nanoparticles comprising a core of a carrier material selected from iron oxide, copper and silicon dioxide have been disclosed in EP 2 530 125, Nachal D. Subramanian et al., *Catalysis Science & Technology*, Vol.2, No. 3, January 2012 and in CN 101 954 256, respectively. In the second one of these documents, the core-shell particles need to be oxidized so as to remove the surfactants used in their synthesis and bound to the surface of the nanoparticles. The resulting nanoparticles show a polyhedron-like morphology with some diffusion of copper from the core to the surface of the nanoparticles.

SUMMARY OF THE INVENTION

In one aspect, the present invention is thus directed to a method for the preparation of spherical core-shell particles, comprising the successive steps consisting of:
(a) mixing a cobalt salt with (i) ammonium carbonate, bicarbonate or carbamate and (ii) ammonium hydroxide in water, so as to obtain an aqueous solution comprising a cobalt amine complex;
(b) heating said aqueous solution to a temperature comprised between 40 and 90° C., either before, while or after adding particles of alumina having a primary particle size of less than 100 nm, so as to precipitate cobalt carbonate onto the surface of the alumina primary particles and to obtain core-shell particles having a core of alumina and a shell of cobalt carbonate;

(c) optionally recovering, washing and/or drying said precipitate;

(d) converting cobalt carbonate in the shell of said core-shell particles into cobalt oxide.

It is understood that the above method may comprise other preliminary, intermediate or subsequent steps, as long as they do not impair the structure and properties of the core-shell particles obtained.

In another aspect, this invention pertains to the core-shell particles which may be obtained according to the above method, comprising a core of alumina and a shell of cobalt oxide, characterized in that they are spherical with a number average diameter of between 10 and 30 nm and preferably between 10 and 20 nm.

It should be noted that all the particle sizes referred to in this specification are measured by TEM (Transmission Electron Microscopy).

In still another aspect, this invention pertains to a catalyst comprising core-shell particles as defined above, embedded in a carrier comprising nanometric particles of a carrier material.

The expression "nanometric particles" refers to particles having a number average diameter, as measured by TEM, of below 100 nm, preferably below 30 nm, more preferably below 20 nm and typically between 5 and 15 nm.

In yet another aspect, this invention pertains to the use of the above core-shell particles for manufacturing an activated catalyst, according to the following successive steps:

mixing the core-shell nanoparticles of this invention with nanometric particles of a carrier material and water so as to obtain a slurry, homogenizing and drying said slurry to obtain a porous catalyst and optionally shaping said catalyst, reducing said catalyst in order to at least partially convert cobalt oxide into elemental cobalt.

In still another aspect, this invention pertains to the uses of said activated catalyst.

The method of this invention allows preparing size-tailored core-shell nanoparticles under economical conditions, especially because it comprises only a few synthetic steps which all use standard low cost chemicals and do not generate hazardous by-products or contaminated waters that should be further treated. This method results in nanoparticles provided with an outer cobalt layer which is only a few nanometers thick. Therefore, most of the cobalt contained in these particles is surface cobalt, which is entirely involved in the catalytic reaction.

DETAILED DESCRIPTION OF THE INVENTION

This invention will now be described in further details. In the following description, the expression "comprised between" should be understood to designate the range of values identified, including the lower and upper bounds.

The novel method of this invention for the preparation of core-shell particles mainly involves the precipitation of a cobalt carbonate shell around a core consisting of nanometric particles of alumina.

Specifically, in the first step of this method, a cobalt salt is mixed with ammonium carbonate, bicarbonate or carbamate and with ammonium hydroxide in water, so as to obtain an aqueous solution comprising a cobalt amine complex, $[Co(NH_3)_6]_{2+}$. Among the cobalt salts, any inorganic salts may be used, but salts of divalent anions such as carbonate are preferred. This step can be carried out at a temperature of 15 to 30° C., preferably from 20 to 25° C., by simply dissolving, generally under stirring, the cobalt salt in a solution of ammonium carbonate, bicarbonate or carbamate in aqueous ammonium hydroxide. The amount of these reactants should preferably be such that the pH of this mixture is between 7.5 and 10, preferably between 9 and 10. The cobalt salt may represent from 0.5 to 10 wt. %, preferably from 1 to 8 wt. %, and more preferably from 3 to 7 wt. %, of the solution. The solution thus obtained preferably contains from 0.1 to 2.5 moles of the cobalt amine complex per liter.

This solution may be filtered so as to remove any possible residue of cobalt salt that would not have dissolved.

This solution is then heated at a temperature comprised between 40 and 90°, preferably between 50 and 70° C. Alumina comprising nanoparticles having a substantially spherical shape and a primary particle size of less than 100 nm, preferably less than 30 nm and more preferably less than 20 nm, typically between 5 and 15 nm, are added to this solution during, after, or preferably before, the heating step. These particles may have a surface area of about 80 to 120 $m^2/g$. They may be used in the form of aggregates which will readily disintegrate into primary particles in an aqueous solution under agitation, such as the product sold by EVONIK under the trade name Aeroxide® Alu-C. The addition of these particles is usually carried out while agitating the solution, for instance by mechanical stirring. In this step of the method, at least one other metal salt may be added, especially salts of catalytic promoters such as platinum, manganese or ruthenium and their mixtures.

The atomic ratio of alumina to cobalt may be tuned as needed and may for instance range from 100:1 to 1:3 and preferably from 1:1 to 1:2. The slurry formed may be maintained at the aforesaid temperature for 2 to 72 hours, preferably from 12 to 36 hours. Such heating results in the evaporation of ammonia and carbon dioxide and thus in a lowering of the pH, which itself gives rise to the decomposition of the cobalt amine complex into cobalt carbonate. The latter precipitates onto the surface of the alumina particles which thus act as a nucleating agent.

Although not necessary, this precipitate may then be recovered by any appropriate means, such as by filtration, centrifugation or any other method for separating solids from liquids. It is then preferably washed with water at 10-40° C., for instance at 10-30° C. It may then be dried, for instance at a temperature between 100 and 150° C.

Core-shell particles having a core of alumina and a shell of cobalt carbonate are thus obtained.

These core-shell particles are then treated so as to convert cobalt carbonate into cobalt oxide. This can be achieved by prolonged heating at the precipitation temperature, i.e. between 50 and 90° C. or preferably between 50 and 70° C., or by calcination at a temperature of 250 to 600° C., and preferably from 300 to 500° C.

The oxidic core-shell particles thus obtained have a spherical shape with a number average diameter, as measured by Transmission Electron Microscopy (TEM), comprised 5 between 10 and 30 nm and preferably between 10 and 20 nm. The thickness of the cobalt oxide shell is comprised between 1 and 5 nm and preferably between 1 and 3 nm, as also measured by TEM. The lower this thickness, the higher the cost savings compared to usual cobalt particles used in catalysts. Usually, the particles of this invention do not include any other metal oxide then cobalt oxide and the alumina core, except the above-mentioned promoters, if present. In case these promoters are needed, they can be added to the nanoparticles of this invention either during their synthesis, as explained above, or after their synthesis, for instance by impregnation.

These cobalt oxide/alumina nanoparticles constitute a catalyst precursor, in that they may be used to manufacture catalysts involved in hydrogenation reactions such as the hydrogenation of aromatic or olefinic compounds, e.g. waxes, nitro, nitrile or carbonyl compounds, such as the conversion of nitrobenzene to aniline or the conversion of fatty nitriles to amines or the hydrogenation of aldehydes to the corresponding alcohols. They may also be useful in various other reactions and more specifically in the Fischer-Tropsch process. This may be part of an overall process for the conversion of natural gas to petroleum compounds wherein the hydrogen/carbon monoxide gas mixture used in the Fischer-Tropsch reaction is a syngas formed by steam reforming natural gas.

Whatever the reaction in which they are used, the nanoparticles of this invention are preferably included within a carrier which comprises from 50 to 100%, and preferably from 90 to 100% of nanometric particles of a carrier material, relative to the total weight of the carrier, so as to form a catalyst. This carrier material may be the same as that used in the core of the particles, i.e. alumina, or it may be different. In the latter case, it may be selected from the group consisting of silica; titania; activated carbon; silicon carbide; and their mixtures. Preferably, the same material is used both in the core of the particles and as a carrier in this step of the process. This carrier is usually beneficial to the retention of the core-shell structure under reducing conditions. Moreover, it has been shown that this specific carrier avoided deactivation of the catalyst by sintering, which usually occurs when impregnating core-shell nanoparticles into micrometric carriers which bind weakly to these nanoparticles. Sintering may thus be reduced by mixing the core-shell nanoparticles with the nanometric particles of the carrier material, preferably in the presence of water, so as to obtain a slurry which is then homogenized by stirring. This ensures a high dispersion of cobalt in the catalyst prepared from this slurry. The optimum amount of oxidic core-shell particles present in the carrier may vary, depending on the catalytic activity required. Typically, the amount of cobalt present in the catalyst may range from 1 to 25% by weight of catalyst, for instance from 10 to 20% by weight of catalyst. The amount of cobalt may be easily tuned by adding an appropriate amount of core-shell particles to the nanometric particles of the carrier material, without altering the particle size and the level of dispersion.

The above slurry is further dried, for instance at a temperature between 30 and 90° C., which results in a porous catalyst, usually a mesoporous catalyst, in the form of a powder, having oxidic core-shell nanoparticles embedded within its structure. This catalyst may be shaped or formed by means of spray drying, pelletizing, (wheel) pressing, extrusion, or application on a metal support like a metal wire. It is preferably shaped into pellets.

After optional shaping, the catalyst is generally activated, i.e. reduced by contacting it with hydrogen, optionally diluted with an inert gas such as nitrogen, typically at temperatures of about 300° C. to 800° C., preferably between 300 and 400° C., in order to convert cobalt oxide into elemental cobalt. Preferably, at least 70 wt. % of the total cobalt in the activated catalyst will be in the elemental state.

The activated catalyst may then be used as a slurry catalyst or preferably as a fixed bed catalyst. For instance, if developed for carrying out the Fischer-Tropsch reaction, this catalyst may be used in fixed bed reactors, especially multitubular fixed bed reactors, fluidised bed reactors, such as entrained fluidised bed reactors and fixed fluidised bed reactors, and slurry bed reactors such as three-phase slurry bubble columns.

This invention will be better understood in light of the following examples which are given for illustrative purposes only and do not intend to restrict the scope of this invention as defined by the attached claims.

EXAMPLES

Example 1

Synthesis and Characterization of $Co/Al_2O_3$ Core-Shell Particles 77.3 mL of demineralised water and 5.47 g of ammonium carbonate were added to 30.5 mL of a 25 wt. % ammonia aqueous solution. The solution was stirred while 0.74 g of cobalt carbonate was added. After the solution turned dark red, it was filtered and 0.18 g of alumina particles (Aeroxide Alu-C supplied by ALDRICH, diameter=13 nm, specific area=100 $m^2/g$) was then added to the filtrate containing the cobalt amine complex thus formed. The reaction mixture was heated from room temperature to 70° C., using an oil bath, and the temperature was maintained during the precipitation process. A suspension of core-shell particles was thus obtained. The particles suspension was further heated at 70° C. so as to obtain core-shell particles with a core of alumina and a shell of cobalt oxide, consisting mainly of $Co_3O_4$, with a thickness of about 3 nm.

0.93 g of these particles was then added to 1.65 g of the same alumina as used for the core. A slurry was prepared from this mixture by adding 100% of water relative to solid material. The slurry was then dried and shaped in order to produce pellets of a catalyst precursor.

The catalyst thus obtained contained 20 wt. % of cobalt, relative to the total weight of the catalyst. EDX line analysis revealed the core-shell structure of the particles. HR-TEM characterization of these particles displayed alumina particles decorated with 3 nm sized cobalt oxide nanoparticles so as to form a sort of "berry".

Example 2

Catalytic Tests

The catalyst of Example 1 was reduced by heating the reactor to 435° C. in $H_2$ (20 l/h STP, 3K/min). The temperature was maintained for 10 h. The reduced catalyst was cooled to room temperature in hydrogen. Fischer-Tropsch synthesis was conducted by heating the reactor to 210° C. at 30 bars for approximately 5 h in synthesis gas at approximately 10% conversion and holding the reactor in those conditions for approximately 100 h, to assure steady state. After that, the reactor was heated to the desired temperature (230° C.) and was run for 16 h with the new parameters prior to measuring. Products were collected and analysed during 20-26 h of synthesis time.

This catalyst exhibited a very good performance with a selectivity of 81% for C5+ hydrocarbons, 10% for methane, 9% for light olefins and only 0.3% for $CO_2$. Furthermore, its productivity was 0.45 $g_{C5+}/g_{cata}/h$ where "$g_{C\,5+}$" refers to the weight of olefins having at least 5 carbon atoms and "$g_{cata}$" designates the weight of catalyst used. The calculated productivity, based on conversion, selectivity and CO flow, was 0.52 $g_{C5+}/g_{cata}/h$, i.e. slightly above the observed value and comparable to the calculated productivity for a conventional catalyst comprising large cobalt crystallites (30-45 wt. %) supported on a micrometric titania carrier. Finally, productivity calculated on cobalt mass basis was 2.62 $g_{C5+}/g_{Co}/h$ for the catalyst of Example 1 and 1.96 $g_{C5+}/g_{Co}/h$ only for the conventional catalyst. These results demonstrate that the novel core-shell nanoparticles of this invention allow the manufacture of a catalyst having, after reduction, similar selectivities and higher productivities, in the Fischer-Tropsch reaction, than conventional cobalt-based catalysts which contain much more cobalt.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for the preparation of spherical core-shell particles, comprising the following successive steps:
    (a) mixing a cobalt salt with (i) ammonium carbonate, bicarbonate or carbamate and (ii) ammonium hydroxide in water, so as to obtain an aqueous solution comprising a cobalt amine complex;
    (b) heating said aqueous solution to a temperature comprised between 40 and 90° C., either before, while or after adding under agitation particles of alumina having a substantially spherical shape and a number average diameter of less than 30 nm as measured by TEM, so as to disintegrate alumina aggregates into primary particles and precipitate cobalt carbonate onto the surface of the alumina primary particles and to obtain core-shell particles having a core of alumina and a shell of cobalt carbonate; and
    (c) converting cobalt carbonate in the shell of said core-shell particles into cobalt oxide, wherein the core-shell particles obtained are spherical with a number average diameter, as measured by TEM, of between 10 and 30 nm and a number average thickness of the cobalt oxide shell, as measured by TEM, is comprised between 1 and 5 nm.

2. The method according to claim 1, wherein the temperature in step (b) is comprised between 50 and 70° C.

3. The method according to claim 1, wherein the cobalt salt represents from 0.5 to 10 wt. % of the solution in step (a).

4. A core-shell particle obtainable according to the method of claim 1, comprising a core of alumina and a shell of cobalt oxide, wherein said core-shell particles are spherical with a number average diameter, as measured by TEM, of between 10 and 30 nm and the number average thickness of the cobalt oxide shell, as measured by TEM, is between 1 and 5 nm.

5. A method for manufacturing an activated catalyst, said method comprising the steps of:
    mixing the core-shell nanoparticles obtainable according to the method of claim 1, comprising a core of alumina and a shell of cobalt oxide, with nanometric particles of a carrier material having a number average diameter as measured by TEM of below 100 nm and water so as to obtain a slurry,
    homogenizing and drying said slurry to obtain a porous catalyst and optionally shaping said catalyst,
    reducing said catalyst in order to at least partially convert cobalt oxide into elemental cobalt.

6. The method according to claim 1 wherein the core-shell particles obtained at step (b) are recovered and dried before the step (c) of conversion.

7. A catalyst comprising core-shell particles as defined in claim 4, embedded in a carrier comprising nanometric particles of a carrier material having a number average diameter as measured by TEM of below 100 nm, wherein the carrier material is selected from the group consisting of alumina, silica, titania, activated carbon, silicon carbide and their mixtures.

* * * * *